US008870025B2

(12) United States Patent
Reddy et al.

(10) Patent No.: US 8,870,025 B2
(45) Date of Patent: Oct. 28, 2014

(54) METHOD AND DEVICE FOR ASEPTICALLY DISPENSING MULTIPLE PORTIONS OF A FLUID

(75) Inventors: Balakrishna Reddy, Dublin, OH (US); James Tuot, Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/453,721

(22) Filed: Apr. 23, 2012

(65) Prior Publication Data

US 2012/0325846 A1 Dec. 27, 2012

Related U.S. Application Data

(63) Continuation of application No. PCT/US2009/061863, filed on Oct. 23, 2009.

(51) Int. Cl.

| | |
|---|---|
| ***B67B 7/00*** | (2006.01) |
| ***G01F 11/00*** | (2006.01) |
| ***B65D 37/00*** | (2006.01) |
| ***B67D 7/78*** | (2010.01) |
| ***B67D 1/10*** | (2006.01) |
| ***B67D 1/12*** | (2006.01) |
| ***B67D 1/00*** | (2006.01) |
| ***F04B 43/12*** | (2006.01) |

(52) U.S. Cl.
CPC .............. *B67D 1/0022* (2013.01); *B67D 1/108* (2013.01); *B67D 1/1275* (2013.01); *F04B 43/1261* (2013.01)
USPC ............. 222/1; 222/145.5; 222/213; 222/214

(58) Field of Classification Search
CPC ............ A61M 5/14; A61M 2001/1039; F04B 43/1253; F04B 43/082; B67D 1/108; B67D 1/0004
USPC ........ 222/129.1, 214, 135–137, 145.5, 145.6, 222/319, 333, 397, 1, 207, 213
See application file for complete search history.

(56) References Cited

U.S. PATENT DOCUMENTS 2,647,661 A * 8/1953 Harvey ........................... 222/68
4,155,362 A * 5/1979 Jess ............................... 604/507
(Continued)

FOREIGN PATENT DOCUMENTS

EP 0499417 8/1992
GB 1058586 2/1967
(Continued)

OTHER PUBLICATIONS

International Search Report for Application No. PCT/US2009/061863 mailed on Aug. 2, 2010.
(Continued)

*Primary Examiner* — Kevin P Shaver
*Assistant Examiner* — Matthew Lembo
(74) *Attorney, Agent, or Firm* — K&L Gates LLP

(57) ABSTRACT

A method and a device for dispensing multiple portions of a fluid, the fluid being stored in a container comprising a port and a flexible dispensing tube having an inlet and an outlet, the inlet being integrally sealed to the port and viscoelastic valve is mounted in the outlet. The method comprising a compression step and a step of terminating compression wherein the method comprises a further step implemented at the end of the compression step of releasing the pressure in the tube portion between the first tube portion and the valve.

14 Claims, 5 Drawing Sheets

(56) References Cited

U.S. PATENT DOCUMENTS

| | | | | | |
|---|---|---|---|---|---|
| 4,256,242 | A * | 3/1981 | Christine | 222/207 |
| 4,976,593 | A * | 12/1990 | Miyamoto | 417/476 |
| 5,035,350 | A * | 7/1991 | Blette et al. | 222/212 |
| 5,105,992 | A * | 4/1992 | Fender et al. | 222/52 |
| 5,151,019 | A | 9/1992 | Danby et al. | |
| 5,165,873 | A * | 11/1992 | Meijer | 417/474 |
| 5,433,351 | A * | 7/1995 | Okuyama et al. | 222/214 |
| 5,836,484 | A * | 11/1998 | Gerber | 222/494 |
| 5,875,930 | A * | 3/1999 | Nakajima et al. | 222/129.1 |
| 6,092,695 | A * | 7/2000 | Loeffler | 222/207 |
| 6,142,340 | A * | 11/2000 | Watanabe et al. | 222/66 |
| 6,286,725 | B1 * | 9/2001 | Gerber | 222/207 |
| 6,394,312 | B1 * | 5/2002 | Endou | 222/129.1 |
| 7,191,957 | B2 * | 3/2007 | Anderson | 239/99 |
| 7,243,682 | B2 | 7/2007 | Brandes | |
| 7,661,352 | B2 * | 2/2010 | Sher et al. | 99/275 |
| 7,980,425 | B2 * | 7/2011 | Baron et al. | 222/214 |
| 2005/0189375 | A1 * | 9/2005 | Mcgill | 222/1 |
| 2006/0249536 | A1 * | 11/2006 | Hartman et al. | 222/129.3 |
| 2007/0068966 | A1 * | 3/2007 | Orzech et al. | 222/136 |
| 2007/0068969 | A1 * | 3/2007 | Orzech et al. | 222/214 |
| 2009/0159616 | A1 * | 6/2009 | Chen | 222/214 |
| 2013/0043274 | A1 * | 2/2013 | Contal | 222/129.1 |

FOREIGN PATENT DOCUMENTS

| | | |
|---|---|---|
| GB | 2225065 | 5/1990 |
| JP | 07-125799 | 5/1995 |
| JP | 09-216695 | 8/1997 |
| JP | 10141235 A * | 5/1998 |
| JP | 2003-182797 | 7/2003 |
| JP | 2006-061797 | 3/2006 |
| JP | 2007-525303 | 9/2007 |
| JP | 2010-017089 | 1/2010 |
| WO | WO 01/12351 | 2/2001 |
| WO | WO 2006063000 | 6/2006 |

OTHER PUBLICATIONS

International Preliminary Report on Patentability/Written Opinion for Application No. PCT/US2009/061863 mailed on Apr. 24, 2012.

Mexican Office Action for Application No. MX/a/2012/004698 dated Jul. 17, 2014, 5 pages.

* cited by examiner

METHOD AND DEVICE FOR ASEPTICALLY DISPENSING MULTIPLE PORTIONS OF A FLUID

CROSS REFERENCE TO RELATED APPLICATIONS

This application is a continuation of International Application PCT/US09/061,863 filed Oct. 23, 2009, the content of which is expressly incorporated herein by reference thereto.

FIELD OF THE INVENTION

The present invention relates to a method and a device for dispensing discrete portions of a microbacterial sensitive fluid in a safe aseptic manner.

BACKGROUND

One way to aseptically dispense a microbacterial sensitive fluid through a dispenser consists in storing the fluid in a bag-in-box (BIB) type container with a delivery tube comprising an aseptic one-way valve at the outlet of the tube. A type of aseptic valve consists of a so-called visco-elastic valve comprising a valve body presenting a cylinder or a truncated cone form and the valve body comprising an internal channel connected to one or several fluid delivery ports. The valve also comprises an elastomeric cylinder having an internal section smaller than the section of the valve body so that the elastomeric cylinder is tightly fitted over the fluid delivery ports and over the valve seat.

Such a valve is, for example, set forth in U.S. Pat. No. 7,243,682, U.S. Pat. No. 5,836,484 or WO 2006!063000. The dispensing is accomplished by the means of a pump that exerts a pressure on the flexible tube and on the fluid present in the tube, and then in the valve body internal channel and delivery ports. When the fluid pressure exceeds the pressure outside the valve, this pressure urges the elastic cylinder away from the valve body and the delivery ports. Fluid then flows out between the valve body and the elastic cylinder. When the pump is stopped, the pressure outside the valve body exceeds the fluid pressure and the elastic cylinder is clamped tightly against the valve body, thereby preventing flow back through the valve. Consequently flow is only permitted in one direction.

Yet, it has been observed in such dispensers that the aseptic state between two fluid deliveries is not maintained system-wide. Depending of the valve design, the visco-elastic valves can maintain a certain back-pressure after the pump has stopped and it can take a few minutes before the fluid pressure effectively drops to a lower pressure. Then at the exact closing of the valve the status of the valve is not certain as the valve is too close to an open position to ensure a full and firm closure.

Starting from a valve which is open and delivers a certain liquid flow, a reduction of the pressure of the liquid results in a reduced flow rate and further reduction of the pressure results in a situation where the flow rate reaches zero when the valve reaches what is called the closing pressure. At that point the check valve is in a not very stable status: it is close to being open yet is closed. This is represented by the valve typically slowly leaking a few drops of liquid thus possibly compromising the aseptic state of the remaining liquid. At that closing point, a typical valve, made with an elastomeric membrane fitted over a solid valve seat, the membrane is already fitted onto and in contact with the valve scat. However this fit is not very tight, as is demonstrated by the accumulation of a liquid droplet or dripping from the valve over a short time (up to one minute). After a minute or so of dripping, then the pressure in the delivery system upstream of the valve reaches another value where the valve is now holding a constant pressure over time called the holding pressure. During these phases the check valve is vulnerable to microbial contamination. This phenomenon has been particularly observed in situations where viscous fluids are dispensed or for fluids comprising particulates.

SUMMARY

An advantage of the present invention is to propose a dispensing method and a corresponding dispenser that provides a secure closing of the valve immediately after the pump has stopped.

An embodiment of the invention relates to a method for dispensing multi-portions of a fluid, the fluid being stored in a container comprising a port and a flexible dispensing tube having an inlet and an outlet, the inlet being integrally scaled to the port and a valve being mounted in the outlet, the valve comprising:

a delivery block having an input port for receiving fluid exiting the tube outlet and an internal channel beginning at the input port and terminating in at least one output port, an elastomeric membrane for enveloping the delivery block so that a portion of the elastomeric membrane covers the output port and the downstream end of the elastomeric membrane forms the valve outlet, the method comprising two alternative steps comprising:

a compression step during which a first portion of the flexible dispensing tube is compressed so that the fluid is compressed and forced downstream through the internal channel of the valve delivery block and the compressed fluid extends the elastomeric membrane at the output port and flows between the elastomeric membrane and the delivery block, reaching the valve outlet, and a termination of compression step, wherein the method comprises a further step implemented at the end of the compression step comprising releasing the pressure in the portion of the tube between the first tube portion and the valve.

Preferably during the further step, the pressure in the tube portion between the first tube portion and the valve is less than 1 psi.

According to an embodiment, the compression step is achieved by rotation a peristaltic pump. In this embodiment, the step for releasing the pressure can consist of rotating the peristaltic pump in the opposite direction to the pumping direction.

The further step can also comprise subjecting a second portion of the tube, located downstream to the first tube portion, to a short compression. Preferably, the short compression exerts a force sufficient so that the tube empties a portion of the fluid present between the second tube portion and the valve. During this further step, the short compression can exert a force for less than a second. Such a compression can be achieved by a pinch valve.

The last pressure release step is performed at the end of tube compression step, preferably less than one second after the end of the compression step.

The method of the present invention is, in an embodiment, used for dispensing fluids having a viscosity greater than 100 cP. In the present invention, the viscosity values are given for a measure made at ambient temperature, that is 21° C.

The method of the present invention can also be particularly used for dispensing fluids comprising particulates. These particulates preferably present a size of at most 200 μm.

Another embodiment of the invention relates to a device for dispensing multiple portions of a fluid, the fluid being stored in a container comprising a port and a dispensing tube having an inlet and an outlet, the inlet being integrally sealed to the port and a valve being mounted in the outlet, the valve comprising:

a delivery block having an input port for receiving fluid exiting the tube outlet and an internal channel beginning at the input port and terminating in at least one output port, an elastomeric membrane for enveloping the delivery block so that a portion of the elastomeric membrane covers the output port and so that the downstream end of the elastomeric membrane forms the valve outlet, the device comprising:

a pump for compressing a first portion of the tube, wherein the device also comprises means for releasing the pressure in the portion of the tube between the first tube portion and the valve.

According to an embodiment of the present invention, the pump is a peristaltic pump.

The means for releasing the pressure in the tube can be compression means that subjects a second portion of the tube, located downstream of the first tube portion, to a short compression. Such compression means can be a pinch member. Preferably, the device comprises a controller configured for sequentially coordinating the movement of the pinch member and the pump.

When a peristaltic pump is used, the means for releasing the pressure in the tube can be a controller configured for monitoring the rotational direction of the peristaltic pump.

Another embodiment of the invention relates to a beverage production machine comprising a device for dispensing multiple portions of a concentrated beverage ingredient such as described above, a diluent supply circuit, and a reconstitution chamber for mixing at least a portion of a concentrated beverage ingredient dispensed by the dispensing multi-portions of a concentrated beverage ingredient with the diluent.

The beverage production machine can also comprise means for frothing the mixture of the concentrated beverage ingredient and the diluent. These means can either be integrated in the reconstitution chamber or separate from the latter.

The machine can be used to dispense, for example, a liquid concentrated beverage ingredient such as a milk based ingredient concentrate and a cocoa based ingredient concentrate.

Additional features and advantages are described herein, and will be apparent from the following Detailed Description and the figures.

BRIEF DESCRIPTION OF THE FIGURES

Referring to the figures.

DETAILED DESCRIPTION

Figure 1:
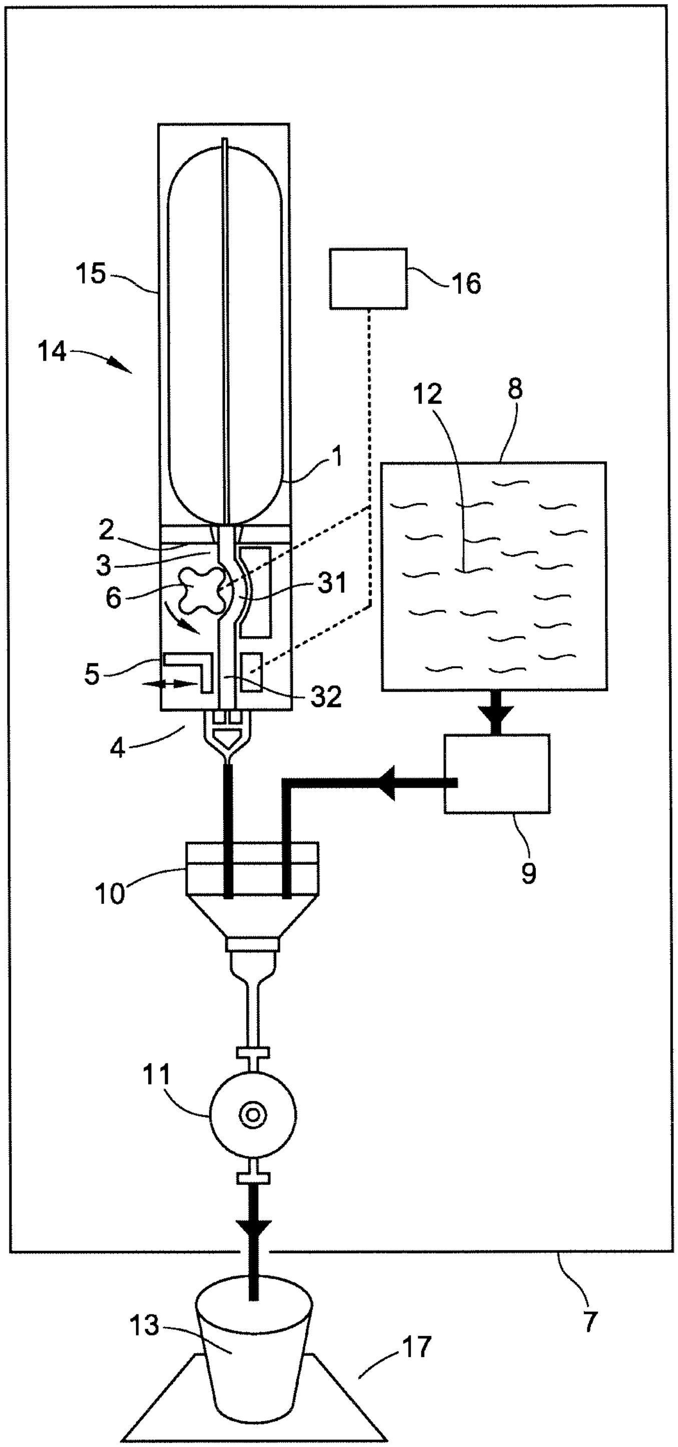
FIG. 1 is an illustration of a beverage production machine according to an embodiment of the present invention.

FIG. 1 illustrates a beverage production machine 7 including a device 14 for aseptically dispensing multi-portions of a fluid according to the invention.

The beverage production machine 7 comprises a diluent supply circuit comprising a diluent tank 8 and a pump 9. Typically, the diluent 12 is water. The circuit can also comprise a diluent heater (not illustrated). The diluent supply circuit delivers the diluent to a reconstitution chamber 10 in which a concentrated beverage ingredient is also delivered. The reconstitution chamber 10 usually is designed for improving the mixing of the diluent 12 and the concentrate so that an effective dilution of the concentrated beverage ingredient is realised. This feature can also be achieved by the orientation of the diluent jet inside the reconstitution chamber.

The concentrated beverage ingredient is delivered to the reconstitution chamber 10 by the device 14 for dispensing multiple portions of a fluid. The device comprises a housing 15 in which a container 1 for storing and dispensing the concentrated beverage ingredient is placed. The container is preferably a flexible container that can optionally be placed in a rigid housing like a BIB. The container presents a port 2 to which is sealed a flexible dispensing tube 3 having an inlet and an outlet. The flexible dispensing tube 3 is made of a material that can be squeezed. A one-way valve 4 is mounted in the outlet.

The device 14 for dispensing multiple portions of the fluid can take some of the fluid from the flexible container at discrete moments in time while aseptically storing the rest of the fluid in the flexible container. The device 14 comprises a pump 6 for momentarily compressing a first portion 31 of the tube to deliver several portions of fluid and then stopping the delivery. The pump is preferably a peristaltic pump. During the compression step, the fluid is compressed and forced downstream through the tube and then through the valve 4, whereas when the pump is stopped, the fluid stops circulating through the tube and the valve. Yet, the peristaltic pump maintains a residual pressure on the tube 3 which avoids an efficient closure of the valve.

The device 14 for dispensing multiple portions of the fluid also comprises compression means 5 for subjecting a second portion 32 of the tube located downstream of the first tube portion 31 to a short compression. Preferably the pinch member compresses the tube for less than 1 second, even more preferably less than 0.5 s. Preferably the compression means 5 are a pinch member that can linearly move back and forth to pinch the tube. Linearly actuated compression means are preferred because they can apply a strong compression force on the tube in a short duration. This compression pushes some of the fluid inside the tube through the one-way valve and the fluid pressure in the tube is significantly reduced after the compression to a value less than the pressure at the end of the compression step and much less than the closing and holding pressure of the valve. Then, the fluid inside the tube maintains a residual pressure less than the closing and holding pressure of the valve, guaranteeing an aseptic closure of the valve. The machine 7 preferably comprises a control unit 16 for coordinating the relative operations of the pump 6 and the compression means 5. The pressure release step can also be implemented by reversing the peristaltic pump rotary member in a direction opposite to the pumping rotation direction.

The beverage production machine 7 also comprises means 11 for frothing the mixture of the concentrated beverage ingredient and the diluent, such as a whipper placed downstream of the reconstitution chamber 10. The means for frothing 11 can also be integrated inside the reconstitution chamber 10; it can comprise steam or air injection means.

Finally, the beverage production machine 7 usually comprises a delivery area 17 where the beverage is delivered in a cup 13.

The valve that is used in the device of the present invention is more precisely described with reference to FIGS. 2*a* and 2*b*. The valve 4 comprises a delivery block 41 having an input port 42 that is connected to the container flexible tube 3 for receiving the fluid exiting the tube outlet. The input port 42 opens into an internal channel 43 beginning in the input port and terminating in at least one output port 44. The valve comprises an elastomeric membrane 45 for enveloping the delivery block 41 so that a portion of said flexible elastomeric membrane covers the output ports 44.

Figure 2A:
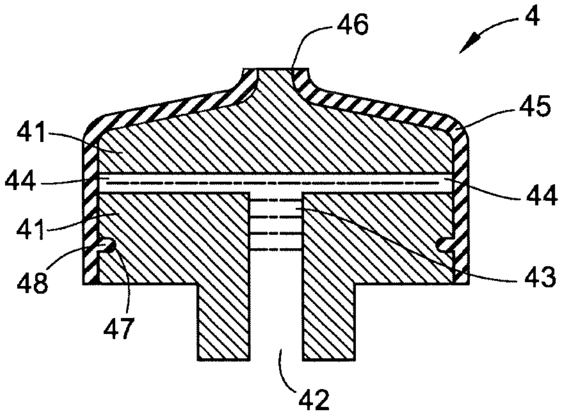
FIGS. 2*a* and 2*b* illustrate how the valve used in an embodiment of the present invention works.

FIG. 2*a* illustrates the valve when it is closed, that is when the fluid inside the channel 43 is not pressurized by the pump 6 or the compression means 5. In this configuration the elastomeric membrane 45 hermetically closes the output ports 44.

Figure 2B:
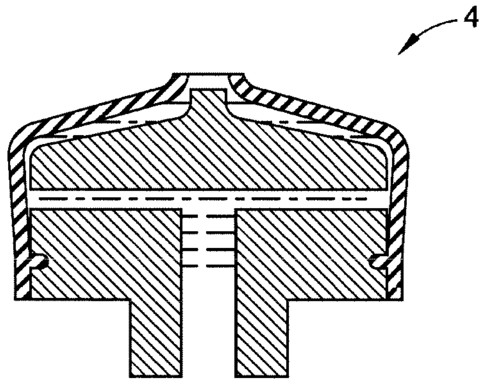

FIG. 2*b* illustrates the valve when it is opened, that is when the fluid inside the channel 43 is pressurized by the pump 6 or the compression means 5 to a pressure sufficient to move the elastomeric membrane 45 away from the output ports 44. The fluid is then free to pass through the outlets ports 44 and circulates between the elastomeric membrane 45 and the delivery block 41 until the valve outlet 46. Preferably the elastomeric membrane 45 includes a protrusion 48 that can fit inside a groove 47 in the external part of the delivery block 41 to avoid the elastomeric membrane 45 sliding along the delivery block 41.

Figure 3A:
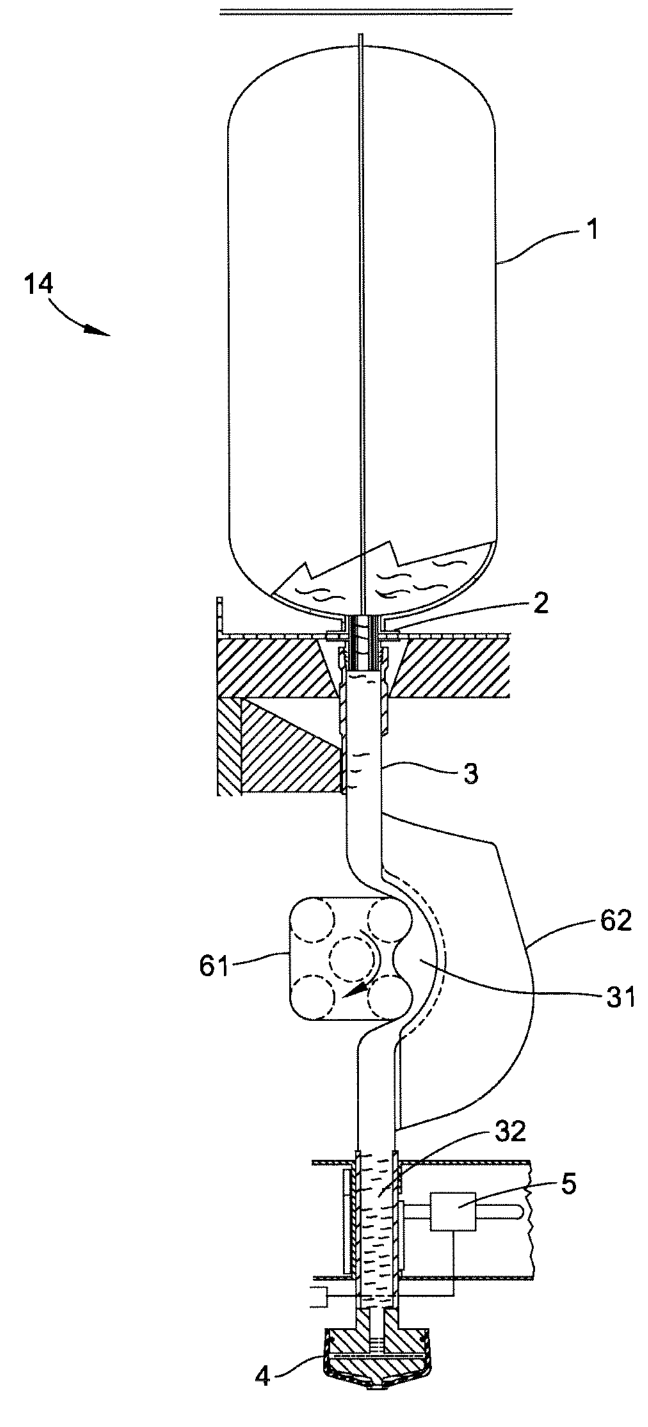
FIGS. 3*a*, 3*b* and 3*c* depict a perspective view of the connecting device of the liquid heater of an embodiment of the present invention.
Figure 3B:
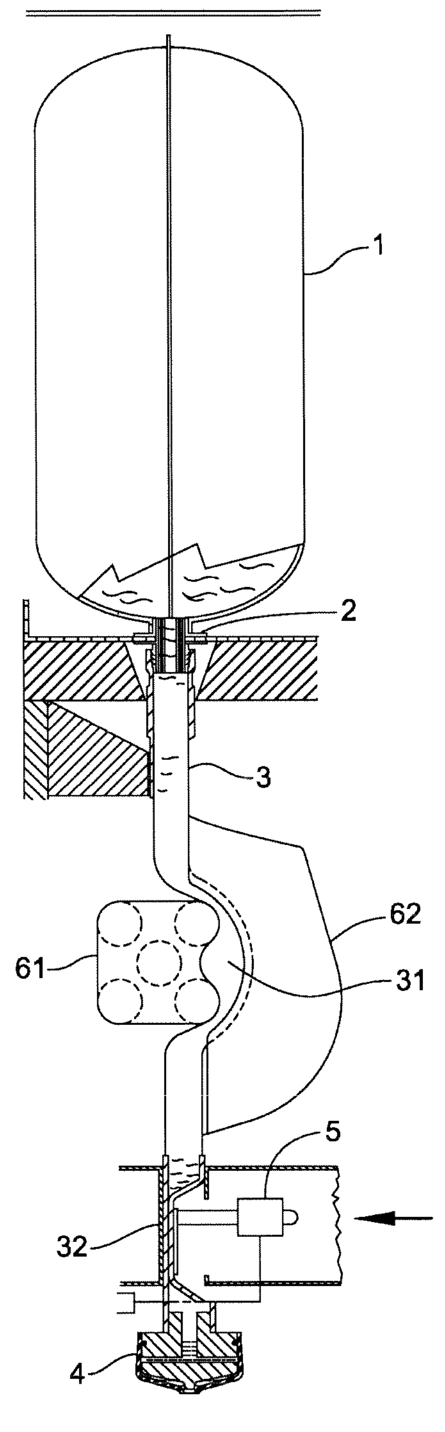

FIGS. 3*a* to 3*b* illustrates the device 14 for dispensing multi-portions of a fluid in each of the three steps implemented in the fluid dispensing process. The pump is a peristaltic pump comprising a static member 62 for which the pump is guided and a mobile member 61 that is able to rotate to press the first portion 31 of the flexible tube fixed by the static member 62.

In FIG. 3*a*, the moving member 61 is rotating. Then the fluid is compressed inside the flexible tube 3 and is urged downstream inside the valve 4, which opens under the force of the pressurized fluid.

The compression member 5 remains inactivated during this step.

In FIG. 3*b*, the mobile member 61 stops rotating and the compression member 5 is immediately activated so that it compresses the fluid inside the second downstream portion 32 of the tube. Then the fluid inside that portion is suddenly driven out downstream subjecting all the fluid between that second portion and the valve to a pressure thereby opening the valve 4. Preferably, the compression member is activated for less than 1 second after the pump is stopped, even more preferably less than 0.5 s.

Figure 3C:
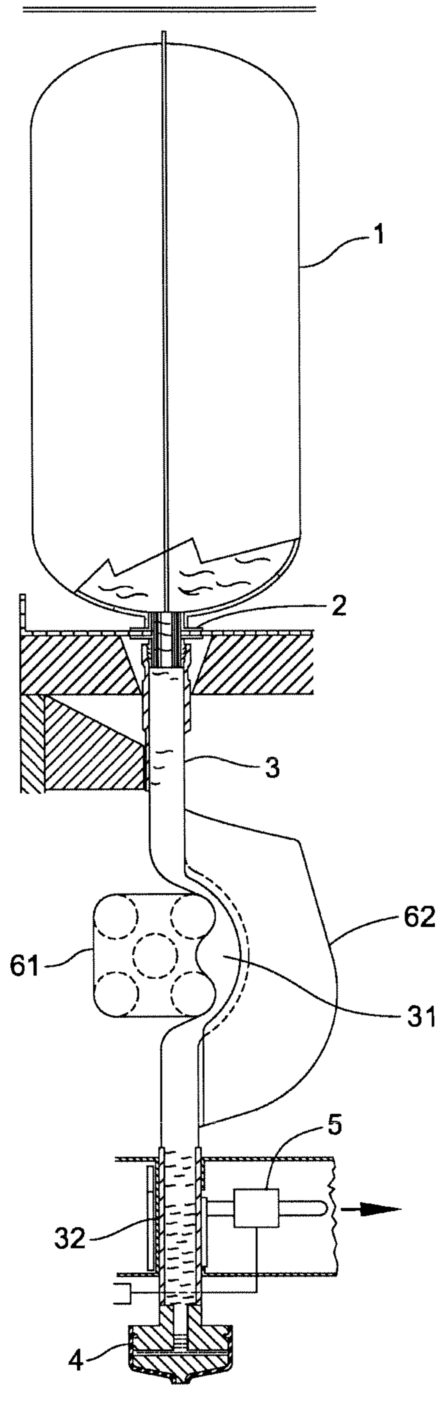

In FIG. 3*c*, the pump 6 is still inactive while the compression member 5 is deactivated so that it releases the second downstream portion 32 of the tube that is refilled with fluid flowing from upstream: therefore, the resultant pressure inside the part of the tube that is downstream to the second portion 32 is low—preferably between 0 to I psi—and quite efficient to obtain a perfect closure of the elastomeric membrane 45 above the outlets ports 44. The nature of the flexible tube material can be chosen so that the deformed tube itself acts as a dampener and provides a slow release.

The present invention presents the advantage of improving the asepsis of the fluid dispensing. The valve closes immediately after the pump is stopped. No dripping occurs after the pump has stopped pumping.

The present invention presents the advantage that it can be used in already existing aseptic dispensers implementing visco-elastic valves for improving their aseptic delivery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A device for dispensing multiple portions of a fluid, the fluid being stored in a container comprising a port and a dispensing tube having an inlet and an outlet, the inlet being sealed to the port and a valve being mounted in the outlet, the valve comprising: a delivery block having an input port for receiving fluid exiting the tube outlet and an internal channel beginning at the input port and terminating in at least one output port, an elastomeric membrane for enveloping the delivery block such that a portion of the elastomeric membrane covers the at least one output port and the downstream end of the elastomeric membrane forms the valve outlet, the device comprising:

- a pump comprising a static member and a mobile member for compressing a first portion of the tube to form pressure in the tube between the first tube portion and the valve;
- a member for releasing the pressure in the tube between the first tube portion and the valve, and the releasing member is downstream from the pump and is a compressor for subjecting a second portion of the tube located downstream of the first tube portion to a short compression; and
- a controller configured to inactivate the pump, activate the compressor after inactivating the pump, and deactivate the compressor while the pump is still inactive to establish a pressure in the second portion of the tube that closes the output port with the elastomeric membrane.

2. The device according to claim 1, wherein the pump is a peristaltic pump.

3. The device according to claim 2 wherein the controller is designed for monitoring the rotational direction of the peristaltic pump.

4. The device according to claim 1, wherein the controller is configured to deactivate the compressor to establish a pressure in the second portion of the tube between 0 and 1 psi.

5. The device according to claim 1 wherein the compressor is a pinch member.

6. A beverage production machine comprising:

- a device for dispensing multiple portions of a concentrated beverage ingredient stored in a container, the device comprising a port and a dispensing tube having an inlet and an outlet, the inlet being sealed to the port;
- a valve being mounted in the outlet, the valve comprising a delivery block having an input port for receiving fluid exiting the tube outlet and an internal channel beginning at the input port and terminating in at least one output port, an elastomeric membrane for enveloping the delivery block such that a portion of the elastomeric membrane covers said at least one output port and the downstream end of the elastomeric membrane forms the valve outlet;
- a pump comprising a static member and a mobile member for compressing a first portion of the tube;
- a member for releasing the pressure in the tube portion between the first tube portion and the valve by subjecting a second portion of the tube located downstream of the first tube portion to a short compression, and the releasing member is downstream from the pump;
- a controller configured to inactivate the pump, activate the releasing member after inactivating the pump, and deactivate the releasing member while the pump is still inactive to establish a pressure in the second portion of the tube that closes the output port with the elastomeric membrane;

a diluent supply circuit; and a reconstitution chamber for mixing diluent with the concentrated beverage ingredient dispensed by the tube.

7. The beverage production machine according to claim 6, comprising a frother for frothing the mixture of the concentrated beverage ingredient and the diluent.

8. A method for dispensing multiple portions of a fluid, the fluid being stored in a container comprising a port and a flexible dispensing tube having an inlet and an outlet, the inlet being sealed to the port and a valve being mounted in the outlet, the valve comprising a delivery block having an input port for receiving fluid exiting the tube outlet and an internal channel beginning at the input port and terminating in at least one output port, an elastomeric membrane for enveloping the delivery block such that a portion of the elastomeric membrane covers the output port and the downstream end of the elastomeric membrane forms the valve outlet, the method comprising:

a compression step during which a first portion of the flexible dispensing tube is compressed with a pump comprising a static member and a mobile member to form pressure in the tube between the first tube portion and the valve, and the fluid is compressed and forced downstream through the internal channel of the valve delivery block and then the output port, thereby opening the valve, which circulates the fluid between the elastomeric membrane and the delivery block to the valve outlet;

stopping circulation of the fluid after completing the compression step by inactivating the pump;

releasing the pressure between the first tube portion and the valve by subjecting a second portion of the tube located downstream of the first tube portion to a short compression by activating a pinch member, wherein during the release of the pressure between the first tube portion and the valve, the short compression by the pinch member exerts a force sufficient to dispense at least a portion of the fluid present between the second tube portion and the valve; and establishing a pressure in the second portion of the tube that closes the output port with the elastomeric membrane by deactivating the pinch member while the pump is still inactive to release the pinch member from the second portion of the tube, wherein the second portion of the tube is refilled with fluid from upstream.

9. The method according to claim 8, wherein the compression step is performed by rotation of a peristaltic pump.

10. The method according to claim 8, wherein the deactivating of the pinch member to release the second portion of the tube establishes a pressure in the second portion of the tube between 0 and 1 psi.

11. The method according to claim 8, wherein, during the release of the pressure between the first tube portion and the valve, the short compression exerts a force for less than one second.

12. The method according to claim 8, wherein the release of the pressure between the first tube portion and the valve is performed less than one second after the end of the stopping circulation step.

13. The method according to claim 8, wherein the fluid has a viscosity greater than 100 cP.

14. The method according to claim 8, wherein the fluid comprises particulates.

* * * * *